May 29, 1923.

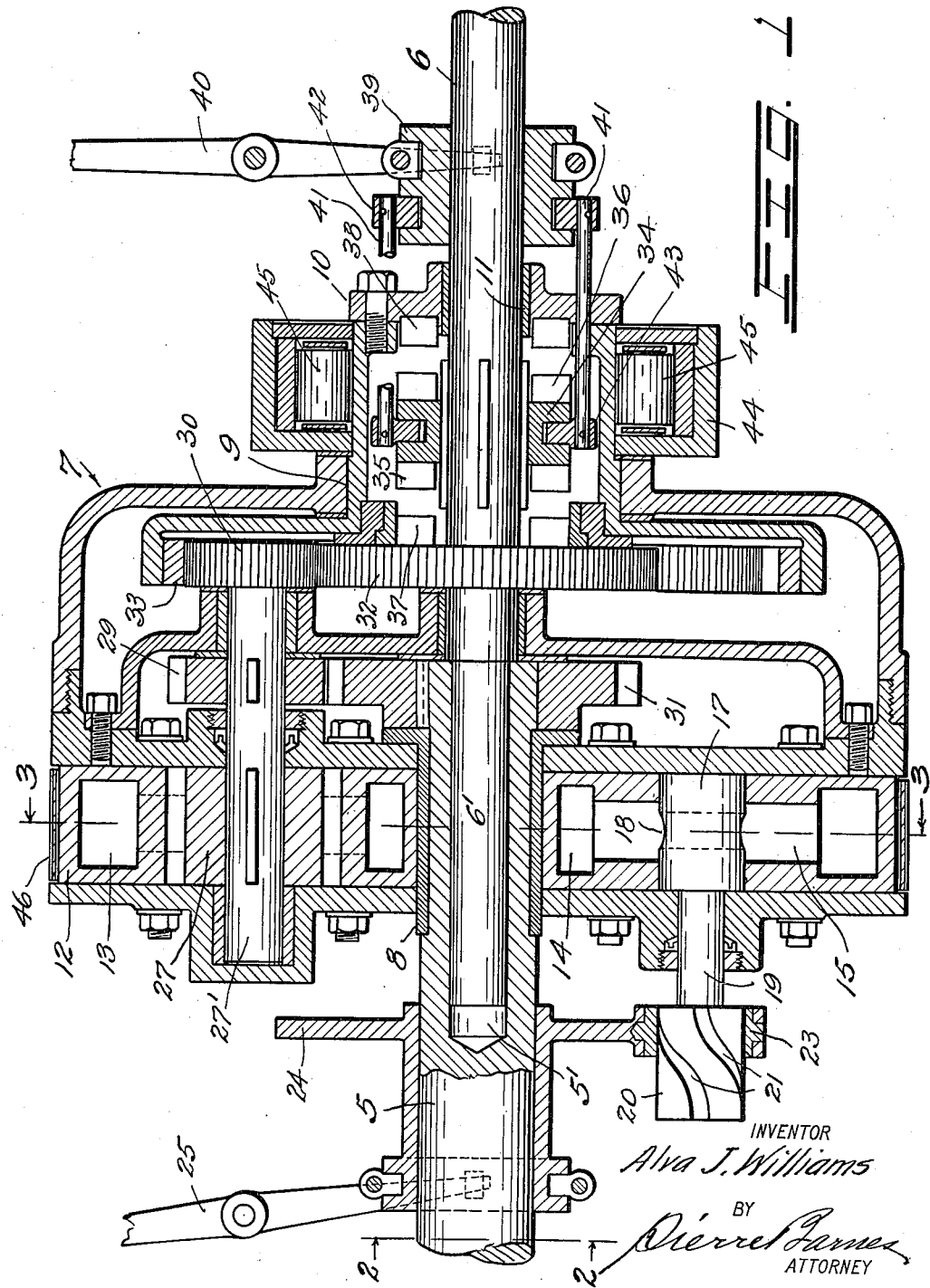

A. J. WILLIAMS

FLUID CONTROLLED TRANSMISSION

Filed Aug. 30, 1921

INVENTOR:
Alva J. Williams
BY
Pierre Barnes
ATTORNEY

Patented May 29, 1923.

1,456,956

UNITED STATES PATENT OFFICE.

ALVA J. WILLIAMS, OF TACOMA, WASHINGTON, ASSIGNOR TO WILLIAMS OIL CONTROL TRANSMISSION COMPANY, OF TACOMA, WASHINGTON, A CORPORATION OF WASHINGTON.

FLUID-CONTROLLED TRANSMISSION.

Application filed August 30, 1921. Serial No. 497,016.

*To all whom it may concern:*

Be it known that I, ALVA J. WILLIAMS, a citizen of the United States, residing at Tacoma, in the county of Pierce and State of Washington, have invented certain new and useful Improvements in Fluid-Controlled Transmission, of which the following is a specification.

This invention relates to fluid controlled power transmission apparatus and, more especially, to improvements in the devices of this character described and illustrated in U. S. Patent No. 1,269,029 issued to me June 11, 1918.

The object of the present invention, generally stated, is to afford a more efficient apparatus for transmitting motion from a driving member to a driven member at the same or different speeds, selectively, in the same or in reverse rotary directions, which will be noiseless in operation, and be under perfect control.

Other objects and advantages of the invention will appear in the following description.

I will describe an embodiment of apparatus adapted for carrying out my invention, it being understood that the illustrated structure is typical and not restrictive, for it will be apparent that changes may be made without departing from the spirit of invention within the scope of the appended claim.

In the accompanying drawings, Fig. 1 is a longitudinal section taken substantially through 1—1 of Fig. 3, with parts in side elevation, of apparatus embodying my invention.

Figure 3:
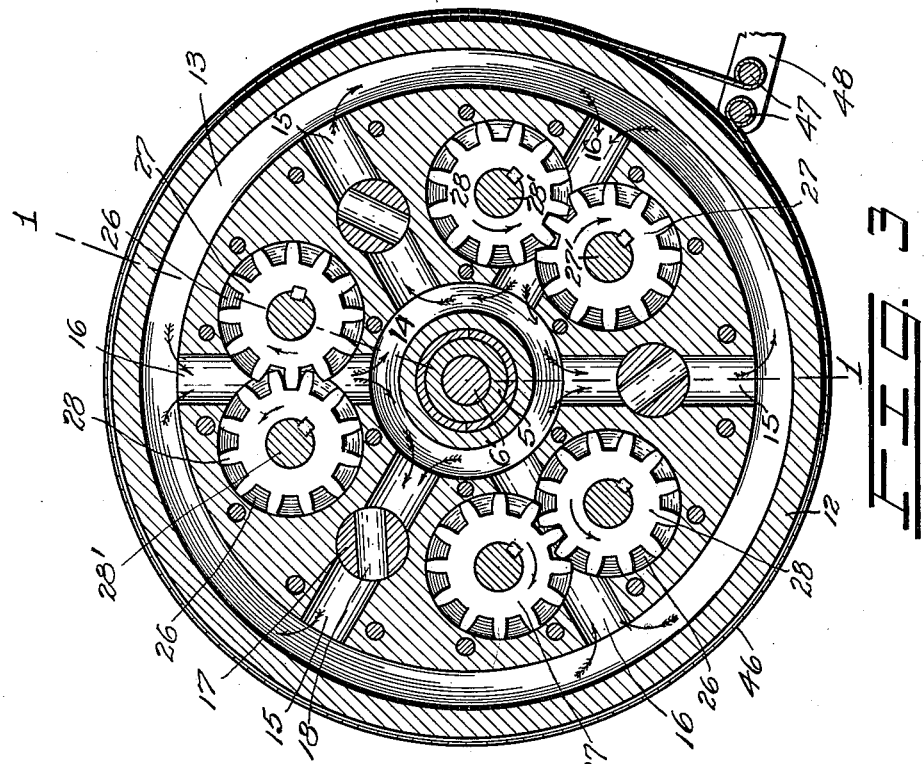
Fig. 3 is a similar view taken substantially through 3—3 of Fig. 1 representing for the sake of clearness the pump gears in end elevation.
Figure 2:
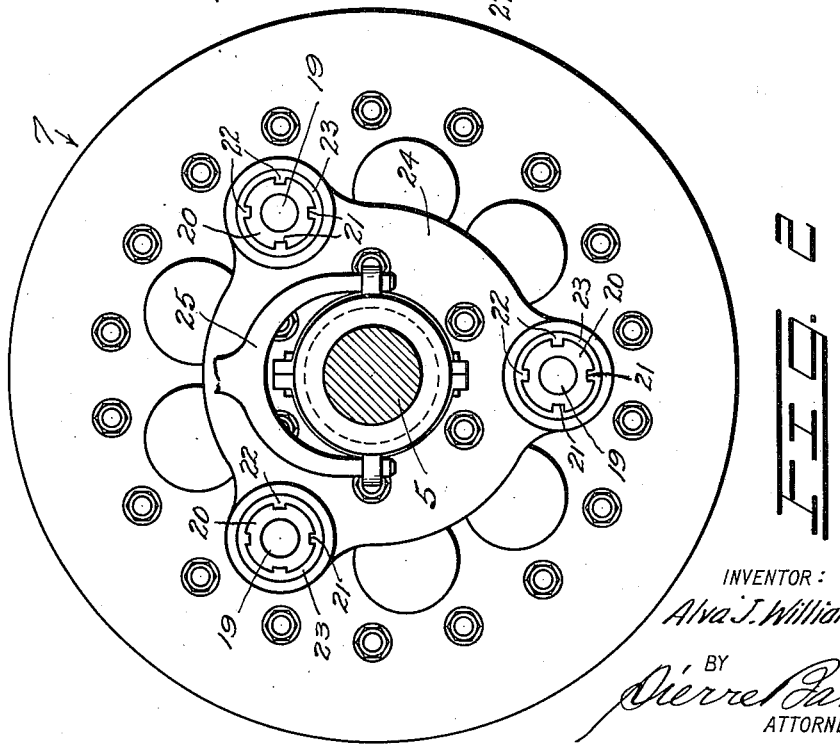
Fig. 2 is a transverse sectional view through 2—2 of Fig. 1.

The drawings illustrate a type of power transmission device suitable for use on motor vehicles.

Referring to the drawings, 5 represents a power driven shaft, hereinafter designated as the driving shaft, which may be the crank shaft of an automobile engine. 6 represents a shaft, hereinafter designated as the driven shaft, receiving its motion from said driving shaft. Said driving and driven shafts are journaled in suitable bearings, not shown, and are retained in axial alignment with each other, most advantageously by extending a reduced portion 6' of the driven shaft into an axial bore 5' of the driving shaft 5.

Said shafts extend axially into a circular casing, denoted generally by 7, which, as shown in Fig. 1 is journaled on a bushing 8 mounted upon the driving shaft 5. The casing is also journaled at 9 upon a drum 10 which, in turn, is journaled through the medium of a bushing 11 upon the driven shaft 6.

Included in said casing is a unit or section 12 provided with two annular fluid receptacles 13 and 14, hereinafter respectively designated as the "reservoir" and "pressure" chambers, which are arranged in spaced relations with each other and concentric with the axis of the aforesaid shafts.

Said chambers are communicatively connected by means of passages 15 and 16 (Fig. 3) arranged radially of the casing and in alternate relations with each other.

Provided in the passages 15 are rotatable plug-valves 17 having ducts 18 extending diametrically therethrough, the valves 17 are connected by stems 19 with cylindrical heads 20, located exteriorly of the casing, and are provided in their peripheries with helical grooves 21 which are engaged by helical ribs 22 provided internally of apertured non-rotatable nut elements 23 which are carried in a spider 24.

This spider is mounted upon the driving shaft 5 to rotate in unison with the casing 7 and is movable axially thereof as by means of a forked lever 25 to effect the rotation of the valves 17 for regulating the effective sizes of the passages 15. Intermediate their lengths each of the passages 16 communicate, as shown in Fig. 3 with a pair of cylindrical pump chambers 26 in which are fitted intermeshing toothed rotors 27 and 28.

In practice, the pump chambers 26, the reservoir 13, pressure chamber 14 and the passages 15 and 16 are filled with oil or other suitable fluid which, upon occasion, is caused to flow in the circulatory directions indicated by arrows in Fig. 3.

Such circulation of the fluid is controlled or entirely stopped by regulating the valves 17.

The pump rotors 27 and 28 are respectively mounted on stub shafts $27^1$ and $28^1$ having bearings in the casing 7.

Each of the shafts $27^1$ for the driving rotors 27 has rigidly mounted thereon spur gears, such as 29 and 30 in Fig. 1, of which the former, 29, of all of the shafts $27^1$ are in continuous mesh with a master gear 31 which is rigidly mounted on the driving shaft 5.

The other spur pinions 30 of the several shafts $27^1$ are in continuous mesh with a spur gear 32 which is mounted loosely upon the driven shaft 6 for rotary motion thereon.

The spur pinions 30 are also in continuous mesh with the teeth of an internal gear 33 which is rigidly secured to, or formed integral with, the aforesaid drum 10.

Splined to the driven shaft 6 interiorly of said drum is a clutch member 34 having at its opposite ends clutch elements illustrated as teeth 35 and 36, which are adapted to be respectively engaged with complementary clutch elements 37 or 38 provided upon the spur gear 32 and the drum 10 for the purpose of coupling either of the gears 32 or 33 with the drum shaft 6.

As represented, the clutch member 34 is shiftable axially through the medium of a collar 39 on the shaft 6 which is controlled by a forked lever 40, the collar member being operatively connected to the clutch member by means of tie rods 41 secured to rings 42 and 43 which are rotatably engaged in peripheral grooves provided in the respective members.

44 represents a relatively stationary stand containing roller bearings 45 or an equivalent in which the drum 10 is rotatably supported.

46 represents a brake band for the casing 7, and is engageable upon the circumferential surface thereof, for preventing the casing from rotating when required.

As shown in Fig. 3, the brake-band ends are connected to studs 47 provided on a lever 48 by which the brake band may be caused to engage the casing or be released therefrom.

The operation of the invention in its embodiment as above set forth may be explained as follows:

The driving shaft 5 rotates the master gear 31 whereby the gears 29 are actuated to normally rotate the respective stub shafts $27^1$ together with the associated pinions 30 and the pump rotors 27.

When thus influenced, the pinions 30 serve to positively rotate the gears 32 and 33. The pump rotors 27 are caused to actuate the complementary rotors 28, to mutually force the fluid controlling agent from the reservoir 13 through passages 16 and pump chambers 26 into the pressure chamber 14.

When the valves 17 are in their full open positions the fluid may return through passages 15 and the valve openings 18 to the reservoir 13 to establish substantially similar pressures of the fluid in both of such chambers.

By adjusting the valves to be in partly open positions, the return flow of fluid to the reservoir 13 is retarded and when the valves are brought into positions to entirely close the passages 15, the fluid forced by the pumps into the pressure chamber 14 will be prevented from returning to the reservoir.

When the valves 17 are adjusted to provide an unobstructed circulation of the liquid, the latter affords but little resistance to the action of the pumps.

When the valves are progressively closed, however, to obstruct and ultimately stop any flow of the liquid from the chamber 14, a liquid pressure is correspondingly created in the latter, to eventually prevent the pump rotors from rotating.

Under such a condition and with the brake band 46 not operative, the stub shafts $27^1$ and the associated pinions 30 are prevented from rotating independently and are thereupon all revolved with the casing 7 by the master gear acting through the medium of the gears 29 to rotate in unison the gear 32, the casing 7 and the drum 10.

Such rotating of the casing may be employed to rotate the driven shaft 6 in unison with the driving shaft 5 by coupling the clutch member 35 with either the gear 32 or the drum 10.

The amount of resistance to the return flow of the fluid to the reservoir governs variations in the speeds of the driven shaft with respect to the driving shaft and, as such fluid resistance is controlled by the valves 17, it is apparent that speed changes transmitted by my apparatus are effected by suitably regulating the valves through the instrumentality of the lever 25.

When the casing, though, is caused to be non-rotatable by employing the brake band 46, the valve-regulated flow of fluid effected by the pumps between the reservoir and pressure chamber enable the master gear 32 to rotate the pinions 30 with or without any orbital movements thereof for driving the gears 32 and 33 in opposite rotary directions so that, by using the clutch to couple the drum shaft with either or such gears, the driven shaft will be rotated in one direction or the other, as desired, and at selected speeds in forward directions only.

While I have illustrated and described the apparatus with a rotatable casing and brake devices for rendering the same non-rotatable, it is not essentially so inasmuch as efficient results are obtainable with the use of a stationary casing.

The operation of the invention will, it is believed, be clearly understood from the foregoing description.

What I claim is:

In transmission apparatus, the combination of a driving shaft, a toothed gear rigidly mounted thereon, a driven shaft, internal and external tooth gears mounted on said driven shaft for independent rotary motion, a casing mounted on one of said shafts for rotation independently thereof, said casing being provided with annularly disposed fluid containing chambers connected by two sets of passages, pump rotors provided in one set of said passages, valves provided in the other set of passages, operative connections between the first named gear and the pump rotors for operating the same, operative connections between said first named gear and the gears aforesaid of the driven shaft, means for coupling either of the last mentioned gears to the driven shaft, means to regulate said valves for controlling the flow of fluid through the respective passages, and means for releasably securing said casing from rotating.

Signed at Seattle, Washington, this 19th day of August, 1921.

ALVA J. WILLIAMS.

Witnesses:
PIERRE BARNES,
MARGARET G. SUPPLE.